(12) United States Patent
Levy et al.

(10) Patent No.: US 6,826,912 B2
(45) Date of Patent: Dec. 7, 2004

(54) DESIGN OF ADIABATIC COMBUSTORS

(75) Inventors: Yeshayahou Levy, Haifa (IL); Patrick Arfi, Aulnay Sous Bois (FR)

(73) Assignee: Yeshayahou Levy, Haifa (IL)

( * ) Notice: Subject to any disclaimer, the term of this patent is extended or adjusted under 35 U.S.C. 154(b) by 76 days.

(21) Appl. No.: 10/068,987

(22) Filed: Feb. 11, 2002

(65) Prior Publication Data

US 2002/0069648 A1 Jun. 13, 2002

Related U.S. Application Data

(63) Continuation-in-part of application No. 09/561,944, filed on May 1, 2000.
(60) Provisional application No. 60/147,481, filed on Aug. 9, 1999.

(51) Int. Cl.$^7$ ................................................ F23R 3/58
(52) U.S. Cl. .......................... 60/750; 60/760; 60/806
(58) Field of Search .......................... 60/750, 760, 804, 60/806; 431/115, 116

(56) References Cited

U.S. PATENT DOCUMENTS

| | | | |
|---|---|---|---|
| 2,809,493 A | | 10/1957 | Pavlecka |
| 2,935,840 A | | 5/1960 | Schoppe |
| 3,269,119 A | * | 8/1966 | Price ........................... 60/804 |
| 3,309,866 A | | 3/1967 | Kydd |
| 3,613,360 A | | 10/1971 | Howes |
| 3,749,548 A | * | 7/1973 | Zink et al. ................... 431/115 |
| 3,964,254 A | * | 6/1976 | St. John ..................... 60/39.52 |
| 4,018,043 A | | 4/1977 | Clemmens |
| 4,084,371 A | | 4/1978 | Howald |
| 4,151,709 A | | 5/1979 | Melconian et al. |
| 5,129,224 A | * | 7/1992 | Shekleton .................... 60/804 |
| 5,154,599 A | | 10/1992 | Wunning |
| 5,280,703 A | * | 1/1994 | Corrado et al. ............... 60/804 |
| 5,331,803 A | | 7/1994 | Shekleton |
| 5,340,020 A | | 8/1994 | Maus et al. |
| 5,727,378 A | | 3/1998 | Seymour |
| 6,293,275 B1 | * | 9/2001 | Wunning .................. 126/91 A |

* cited by examiner

Primary Examiner—Ted Kim
(74) Attorney, Agent, or Firm—Mark M. Friedman

(57) ABSTRACT

An adiabatic combustor for a gas turbine including: (a) a combustion chamber designed and configured to produce high-pressure combustion gases for the turbine, the combustion chamber having a primary combustion zone containing a substantially vitiated-air zone; (b) at least one primary air inlet providing air to the primary combustion zone, and (c) a fuel injector for injecting fuel, disposed such that the fuel is directly introduced to the vitiated-air zone, wherein the primary air inlet is positioned and directed, and the combustion chamber is designed and configured, so as to produce an internal recirculation that generates a toroidal vortex within the primary combustion zone, thereby producing therein the vitiated-air zone and maintaining therein a state of flameless oxidation.

33 Claims, 6 Drawing Sheets

PRIOR ART

DESIGN OF ADIABATIC COMBUSTORS

This is a Continuation-in-Part of U.S. patent application Ser. No. 09/561,944, filed May 1, 2000, currently pending and claims Benefit of Provisional application Ser. No. 60/147,481 filed Aug. 9, 1999.

FIELD AND BACKGROUND OF THE INVENTION

The present invention relates to $NO_x$ emission reduction in power plants without loss of thermal efficiency, and in particular, to the utilization of flameless oxidation to achieve $NO_x$ emissions reduction in adiabatic combustors such as those used in gas turbine engines.

Awareness and sensitivity to environmental issues have been increasing around the world, and in their wake, environmental legislation has dictated increasingly strict standards for stationary, propulsive and vehicular power-plant emissions, including the emission of $NO_x$ gases. $NO_x$ gases are formed mainly at high temperatures and contribute to smog and acid rain at low levels of the atmosphere, and to stratospheric ozone depletion. Carbon dioxide ($CO_2$), another emitted pollutant, is directly linked to the greenhouse effect. Because $CO_2$ is a natural product of efficient hydrocarbon combustion, there is no way of avoiding $CO_2$ production in a combustor using conventional fuels. Hence, a reduction in $CO_2$ emissions from the various kinds of power plants operating with fossil fuels can be obtained only by improvements in the overall thermal efficiency of the system.

Although increased combustor temperatures and pressure ratios improve gas turbine power rating and efficiency, these conditions in conventional combustors tend to promote $NO_x$ formation, such that there is a natural conflict between energy savings and combustion performance on one hand and reduction of pollutant emission on the other hand. Thus, in order to improve gas turbine efficiency, it has been necessary to develop low-$NO_x$ combustion systems. These systems can be divided into two groups of methodologies, one based on post-treatment of flue gases to reduce $NO_x$ levels, and the other based on modification of the internal combustion process. This category can be further divided into two main groups; "dry" techniques in which no additives to the fuel and air supply are applied, and "non-dry" techniques using steam or water injection for flame cooling. The present invention is concerned with the dry techniques of the second category.

The dry techniques include the following main methods:

1. Staged Combustion

Both in the classic technology of fuel staging, which has actually been implemented in commercial service, and in variable geometry (air-staging) technology, the designs introduce additional mechanical complexity and control problems, e.g., moving parts in the case of variable geometry and multi-fuel injection system in the case of fuel-staging. In addition, the pollutant reduction potential is only moderate. In the pilot diffusion flame of a staged combustor, a large amount of $NO_x$ is still produced. Moreover, radially-staged combustors of current design have pattern factors at the turbine inlet which are far from uniform, such that the potential reduction in $NO_x$ emissions is limited.

2. Lean Pre-vaporized Premixed Combustion (LPP)

LPP technologies are based on the combustion of a Lean Pre-vaporized and Pre-mixed mixture to reduce the maximum flame temperature. LPP requires operation of a pre-mixer, which can be damaged by flashback or by auto-ignition of the air-fuel mixture. In addition, leakage of fuel or gases from the pre-mixer into the hot section of the combustor may result in severe failures and even explosion of the engine casing. These safety problems appear to be even more pronounced when using liquid fuels, because of the longer time required for complete pre-evaporation. In addition, LPP can not be used at high air inlet temperatures because under such conditions, the mixture is even more susceptible to early auto-ignition. Moreover, it is known that pre-mixed combustion can lead to combustion instabilities that shorten combustor lifetime. In addition, in order to be fully effective under a wide range of operating conditions and to avoid blow-off at idle or partial loading, the LPP system must be coupled to a variable geometry system.

3. Rich Quench Lean (RQL) Combustion

The Rich-Quench-Lean (RQL) combustion methods are based on a rich combustion phase in a reducing combustion environment followed by a lean combustion to complete the burnout. The main advantage of the rich zone is that it allows reduction of $NO_x$ emissions from Fuel Bound Nitrogen and avoids thermal-NO formation by remaining far in excess of the stoichiometric fuel to air ratio. However, RQL requires physical separation of the combustor into two chambers, rich and lean, as well as an intermediate transition passage known as the quenching zone. RQL technologies also require a special form of cooling for the rich combustion zone. In addition, the primary zone generates a large amount of soot, which radiates heat to the walls, thereby aggravating the cooling problem. The RQL method is limited by the practical difficulty in realizing an effective and uniform quenching between the rich zone and the lean zone. This is due to the fact that in the quenching zone, the stoichiometric ratio is reduced below unity. The requisite degree of complexity to achieve the careful balance between the rich-burn zone and the lean-burn zone over the full range of operation of a gas turbine combustor is subtantial, and consequently, such a balance has yet to be fully realized to date.

4. Catalytic Combustion

Catalytic combustion allows fuel oxidation to take place at temperatures well below the lean flammability limit of the fuel/air pre-mixture. Catalytic combustion can decrease the $NO_x$ emissions by several orders of magnitude. However, the concept is not easily applicable to non-stationary power-plants and has several drawbacks: catalytic combustion requires relatively high inlet temperatures (depending on the catalyst), and therefore requires a control system for inlet conditions. Because of the premixing, there is also risk of auto-ignition of the premixed mixture before the catalytic bed and consequent flashback, which can lead to catastrophic failures. The catalytic bed increases engine weight and pressure losses. In addition, the catalytic beds of today still reduce drastically the reliability and lifetime of the combustor. Therefore, catalytic combustion is not yet a viable technology, particularly for aircraft applications.

5. Exhaust Gas Recirculation (EGR)

Exhaust gas recycling, whether it is internal or external, is an effective method to reduce flame temperature and, thereby, nitrogen oxide emissions. Unfortunately, the efficiency of this method is limited by the maximal available quantity of recirculated exhaust gas since flame instabilities and ultimately blowout can occur if the burner is operated at overly-high recirculation rates. External recirculation is feasible only if the temperature of the recirculated exhaust gas is relatively low, typically about 850° K, as is the case for industrial furnaces. Recirculation at higher temperatures is impractical, mainly due to external piping limitations and thermodynamic losses. In addition, external recirculation is viable specifically in furnace-type applications because such applications are essentially free of geometrical constraints and weight considerations.

The deficiencies in these alternative combustion technologies are particularly manifest in renewable energy applications, such as the combustion of synthesis gas produced from the gasification or pyrolysis of biomass, including municipal waste. Although renewable energy utilization has become an integral part of the energy policies of the European community and the United States, the efficient exploitation of synthetic gas is not widespread because of various technological difficulties. These technological difficulties mainly arise from the LHV (Low calorific Heat Value) of such fuels, which requires operation at super-adiabatic temperatures. In addition, the relatively-high laminar flame speed makes premixing systems using synthesis gas susceptible to combustion instabilities, including auto ignition and flash-back, both of which have an extremely deleterious impact on safety and on $NO_x$ emissions.

Consequently, the utilization of synthesis gas has been largely limited, until now, to atmospheric pressure combustion that results in low-efficiency cycles. Such restrictions preclude the use of synthesis gas in electric power plants using the highly efficient, combined Rankin (low-pressure combustion) and Brayton (high-pressure combustion) thermodynamic cycle.

Flameless Oxidation

It has been found recently that under special conditions, it is possible to achieve a stable form of combustion at high exhaust gas recirculation rates. If the temperature of the recycled exhaust gas exceeds the auto-ignition temperature of the fuel, the fuel is ignited automatically and continuous combustion is sustained. In this flameless oxidation mode, in contrast to the classic diffusion flame, temperature peaks can be avoided even at high air preheat temperatures. This combustion mode is characterized by moderate and distributed temperature rise, small temperature and concentration gradients, low radiation emission and low noise levels. Under these conditions, the thermal-$NO_x$ formation can be largely suppressed. Recent experimental studies have shown that $NO_x$ emissions decrease drastically with the decrease of oxygen concentration in a nitrogen-diluted air stream, especially at high temperatures. This effect could be primarily attributed to reduction of flame temperature, and reduction of O and OH radicals in the flame.

Although many fundamental issues regarding this combustion method still require further investigation, field results conclusively demonstrate the effectiveness of flameless oxidation in reducing $NO_x$ emission levels, even at high operating temperatures. Until now, however flameless oxidation combustion has been applied only in industrial furnaces at atmospheric pressure, using high-momentum jets to locally recirculate a portion of the combustion products.

There are several important reasons why adiabatic external EGR methods (without deliberate heat extraction) and current flameless oxidation systems are not practical for combustion in gas turbines. In sharp contrast to industrial furnaces, gas-fueled and liquid-fueled gas turbines are designed to provide power by adiabatic expansion of the combustion gases from high pressure (typical values are from 4 bar to about 40 bar) to about atmospheric pressure, hence combustion occurs at significantly elevated pressure. In addition, the turbine entry temperature, typically 1100–1700° K, is significantly higher than the exhaust temperature of non-adiabatic industrial furnaces. External recirculation of high-pressure exhaust gases in the above temperature range is thermodynamically inefficient and practically impossible due to a large volume and weight associated therewith. In addition, special, expensive construction materials would be required.

Moreover, geometrical constraints do not allow the implementation of external recirculation in many applications. Additional considerations, including weight and aerodynamics, make external recirculation particularly impractical for use in conjunction with gas turbines and aero-engines.

Recirculation by means of an ejector or high-momentum jet is possible for some applications, however, the ultra-high velocity of the discharge gas impairs the mixing of the gas streams. The poor mixing deleteriously affects the reduction of $NO_x$ emissions and leads to hot spots in the combustor. This can be partially overcome by the application of numerous discrete jets, but this is a rather cumbersome and expensive engineering solution. It must be emphasized that in ejectors, the ratio between motive gas and suction gas is delicate and, more significantly, the ejector performance constrains the ratio to a value that is far from optimal with respect to $NO_x$ emissions and with respect to combustion efficiency.

There is therefore a need for low-cost, safe and reliable $NO_x$ reduction methods that are applicable to gas turbines, and more particularly, to aero-engines. There is also a need for a combustion technology that improves the combustion efficiency and reduces carbon dioxide emissions. Finally, there is a need for a combustion technology that enables safe and efficient utilization of synthesis gas and other low-calorific renewable energy sources.

SUMMARY OF THE INVENTION

It is an object of the present invention to provide a combustor for industrial gas turbines and aero-engines that produces low pollutant emission levels.

It is an object of the present invention to provide an improved combustor for gas turbines, ground and marine vehicular applications and aero gas turbines and jet engines that produces $NO_x$ emissions at levels considerably below the acceptable level according to the most stringent environmental regulations, while allowing operation at high temperature to improve thermal efficiency.

It is a specific object of the present invention to provide an improved combustor for gas turbines and aero-engines in which $NO_x$ formation is controlled, even at high inlet air temperature conditions, such that high-efficiency combine cycles like the Rankin-Brayton thermodynamic cycle can be applied.

It is an object of the present invention to provide a combustor for gas turbines and aero-engines that can safely and efficiently utilize gaseous and liquid fuels including synthetic gas and other low-heat value fuels.

It is an object of the present invention to provide a combustor for industrial gas turbines and aero-engines that is robust, simple to operate, and inexpensive relative to technologies of the prior art.

Finally, it is an object of the present invention to provide a combustor for industrial gas turbines and aero-engines that can be retrofitted in existing systems.

The present invention is an improved combustor design principle for industrial gas turbine engines, aero-engines, jet engines and the like, that achieves stable, flameless oxidation by internal recirculation of burned products, thereby improving combustion efficiency and reducing $NO_x$ emissions. The internal recirculation is achieved by modifying the shapes and positions of the primary and additional air inlets and the shape and positions of the fuel injector(s) to induce the formation of a large recirculation zone in which direct combustion of the fuel in the fresh air flow is avoided. The combustion of fuel in the hot vitiated air avoids temperature peaks and evens the temperature distribution and therefore reduces the production of $NO_x$ gases without compromising flame stability.

According to the teachings of the present invention there is provided a combustor for energy-production systems including: a) a combustion chamber producing pressurized combustion gases and having a primary zone containing a substantially vitiated-air zone; b) a primary air inlet providing air to the primary zone, and c) a fuel injector for injecting fuel, located in the primary zone of the combustion chamber, wherein the fuel injector introduces the fuel into the substantially vitiated-air zone within the primary zone of the combustion chamber to achieve flameless oxidation.

According to another aspect of the present invention there is provided a combustor for energy-production systems including a) a combustion chamber producing pressurized combustion gases and having a primary zone containing a substantially vitiated-air zone; b) a primary air inlet providing air to the primary zone, and c) a fuel injector for injecting fuel, located in the primary zone, wherein a portion of the pressurized combustion gases undergoes internal recirculation in the combustion chamber, and wherein the fuel is introduced by the fuel injector into the substantially vitiated-air zone within the combustion chamber to achieve flameless oxidation.

According to another aspect of the present invention there is provided a combustor for gas turbines including: a) a combustion chamber, encompassed by a wall, producing pressurized combustion gases and having a primary zone containing a substantially vitiated-air zone; b) a primary air inlet providing air to the primary zone; c) a fuel injector for injecting fuel, located in the primary zone, wherein the fuel injector introduces the fuel into the substantially vitiated-air zone within the primary zone of the combustion chamber to achieve flameless oxidation.

According to further features in preferred embodiments of the invention described below, the internal recirculation is achieved by means of a vortex. According to still further features in preferred embodiments of the invention described below, the injected fuel has momentum that is used to augment and stabilize the circulation of the internal vortex.

According to still further features in preferred embodiments of the invention described below, the primary air inlet provides substantially all of the air introduced to the combustion chamber.

According to still further features in preferred embodiments of the invention described below, the combustor further includes at least one secondary inlet.

According to still further features in preferred embodiments of the invention described below, the fuel is a hydrocarbon fuel selected from the group consisting of gaseous fuel, liquid fuel, synthesis gas, and low calorific gas. According to still further features in preferred embodiments of the invention described below, the synthesis gas is produced from an energy source selected from the group consisting of coal, biomass and waste.

According to still further features in preferred embodiments of the invention described below, the combustion chamber wall has an internal surface having an average temperature below 1500° K and a maximum temperature below 2000° K.

According to further features in preferred embodiments of the invention described below, the pressurized combustion exhaust gases have a $NO_x$ level below 20 ppmv. According to still further features in preferred embodiments of the invention described below, the pressurized combustion gases have a $NO_x$ level below 10 ppmv.

According to still further features in preferred embodiments of the invention described below, the pressurized combustion gases are discharged from the combustion chamber at a temperature of at least 1600° K and have a $NO_x$ level below 20 ppmv. According to still further features in preferred embodiments of the invention described below, the pressurized combustion gases are discharged from the combustion chamber at a temperature of at least 1800° K and have a $NO_x$ level below 20 ppmv. According to still further features in preferred embodiments of the invention described below, the pressurized combustion gases are discharged from the combustion chamber at a temperature of at least 1600° K and have a $NO_x$ level below 10 ppmv.

In yet another preferred embodiment, the positioning of the primary and secondary air inlets and fuel injection system are totally separated and oriented, as described in further detail below, such that the fuel is injected into substantially vitiated air.

The global flow parameters in the flameless oxidation combustor of the present invention are similar to those of conventional combustors, such that only minor changes in the ducts between the compressors and the combustor are necessary to implement the flameless oxidation technology in existing combustors.

Thus, in a preferred embodiment of the present invention, the combustor design is applied to existing, conventional combustors of gas turbines and the like (retrofits). Unlike other kinds of modifications, such as catalytic combustion and water/steam/ammonia injection, the combustion method of the present invention requires no auxiliary equipment and no external supply of additional fluids as in alternative processing methods like exhaust gas de-$NO_x$ and flame cooling.

The combustor design of the present invention with internal recirculation overcomes the problems associated with adiabatic combustors of the prior art, and enables flameless oxidation to be applied to adiabatic and high-pressure applications.

For the purposes of this specification and the accompanying claims, the term "high-pressure" with respect to gas turbines, combustion chambers, combustion gases, and the like refers to pressures exceeding 4 bar.

For the purposes of this specification and the accompanying claims, the term "adiabatic" with respect to gas turbines, combustion chambers, and the like, refers to such systems having walls through which there is no designed, deliberate heat extraction. It will be appreciated by those skilled in the art that while heat losses occur in all real systems, making the theoretical adiabatic condition unattainable, many practical systems are designed to approach the adiabatic condition, and any heat interactions with the environment are simply heat losses. By sharp contrast, many practical systems, such as industrial furnaces, heat is deliberately extracted from the combustion gases via a wall or other heat-exchange surface.

For the purposes of this specification and the accompanying claims, the term "gas turbine" or "gas turbines" includes a wide variety of gas turbines, including but not limited to "open" cycle gas turbines, with or without regeneration; combined Brayton/Rankin Cycle power generation systems, and aero-engines.

For the purposes of this specification and the accompanying claims, the term "energy-production systems" refers to a wide variety of both small and large energy-production systems, including electric power generation by "open" cycle gas turbines, with or without regeneration (heat exchangers); combined Brayton/Rankin Cycle power systems using steam and gas turbines for power and heat generation; aero-engines, and other applications in which the combustion products are pressurized and can undergo internal recirculation.

For the purposes of this specification and the accompanying claims, the term "vitiated air" refers to air containing an appreciable amount of combusted product gases, such that the oxygen available for combustion has been partially consumed. The amount of available oxygen in the vitiated air is less than 18%, preferably less than 16%, more preferably less than 14% and most preferably less than 12%.

For the purposes of this specification and the accompanying claims, the terms "flameless oxidation" and "flameless combustion" refer to a mode of combustion wherein the fuel comes into contact with vitiated air, and wherein the temperature of the recycled exhaust gas exceeds the auto-ignition temperature of the fuel, such that sustained and stable combustion is achieved.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention relates to improvements in thermal efficiency and $NO_x$ emissions in adiabatic combustors such as gas turbine engines, and, in particular, it concerns the utilization of flameless oxidation to achieve these improvements.

The present invention provides a design of adiabatic combustors for gas turbine engines and the like, that achieves stable, flameless oxidation by internal recirculation of burned products, thereby improving combustion efficiency and reducing $NO_x$ emissions. The internal recirculation is effected by modifying the positions of the primary and secondary air inlet and the fuel injector to induce the formation of a large recirculation zone in which direct combustion of the fuel in the fresh air flow is avoided. The combustion of fuel in the hot vitiated air reduces the $NO_x$ production without compromising flame stability.

The combustor design of the present invention with internal recirculation enables flameless oxidation to be applied to adiabatic and high-pressure applications, and overcomes the problems associated with adiabatic combustors of the prior art.

The principles and operation of the combustion chamber of the present invention may be better understood with reference to the attached drawings and the accompanying description.

Figure 1A:
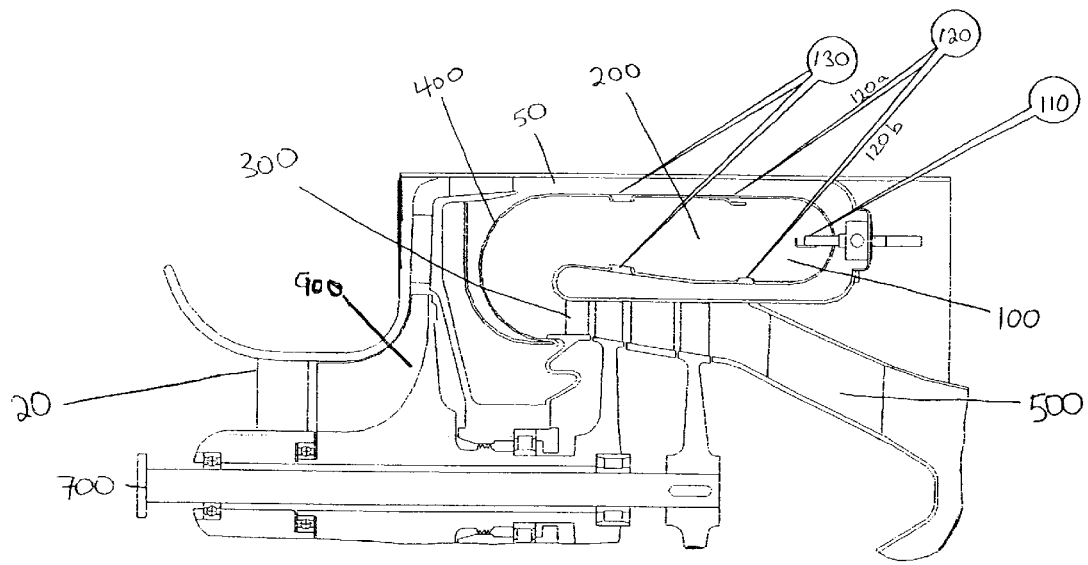
FIG. 1a is a schematic illustration of a conventional (reverse flow type) gas turbine combustor of the prior art.

Referring now to the drawings, FIG. 1a is a schematic illustration of a typical gas turbine having a conventional, reversed flow type combustor of the prior art. The operation of such a conventional gas turbine is based on generating hot and pressurized gases which expand through a free turbine. In the case of a jet engine, the gases expand through an exhaust nozzle. The hot and pressurized gases are generated by the so called "gas generator" which includes a compressor (compressor rotor 900 shown), a combustion chamber 400 and a turbine (turbine blade 500 shown). The compressor compresses the air to a high-pressure level while increasing the temperature slightly.

In the combustion chamber 400, fuel is added and mixed with the air to allow for chemical reaction and for the conversion of the chemical energy of the fuel to thermal energy. This process is typically performed at constant (high) pressure. The exhaust gases 300 are directed to the turbine blade 500, where some of the thermodynamic energy of these gases is converted to mechanical power. The mechanical power is directed via the shaft 700 to rotate the above-mentioned compressor that allows the process to occur.

Subsequently, the gases with their remaining thermodynamic energy expand (not shown) via the second ("free") turbine (or the exhaust nozzle in the case of a jet engine), thereby transforming additional thermodynamic energy to mechanical power. The transferred energy is delivered via a second shaft to the load.

Referring now to the combustor, air is introduced to the combustion chamber 400 from the compressor rotor 900 through the air port 20 into the air intake channel 50 surrounding the combustion chamber 400. Fuel is added directly to the air in the primary zone 100 of the combustion chamber via the fuel injector 110. A portion of the air (about one third) is fed via the main entrance holes 120 to the primary zone 100. In the primary zone 100, the ratio between the fuel mass flow rate and the air mass flow rates is about stoichiometric, thus achieving temperatures of about the adiabatic flame temperature values. Secondary air is introduced through an additional set of holes 130 to the secondary (dilution) zone 200, where the air mixes with the combustion products from the primary zone 100 and reduces the gas temperature. Yet another portion of the air is introduced through very small holes (not shown due to their small size) in such a way as to cool the walls of the combustion chamber 400. These wall-cooling holes are typically distributed almost all over the walls of the combustion chamber 400 (i.e., in both the primary zone 100 and the secondary zone 200). The hot exhaust gases 300 from the combustion chamber 400 (typically 1100–1700° K) are discharged to the turbine blade 500.

Figure 1B:
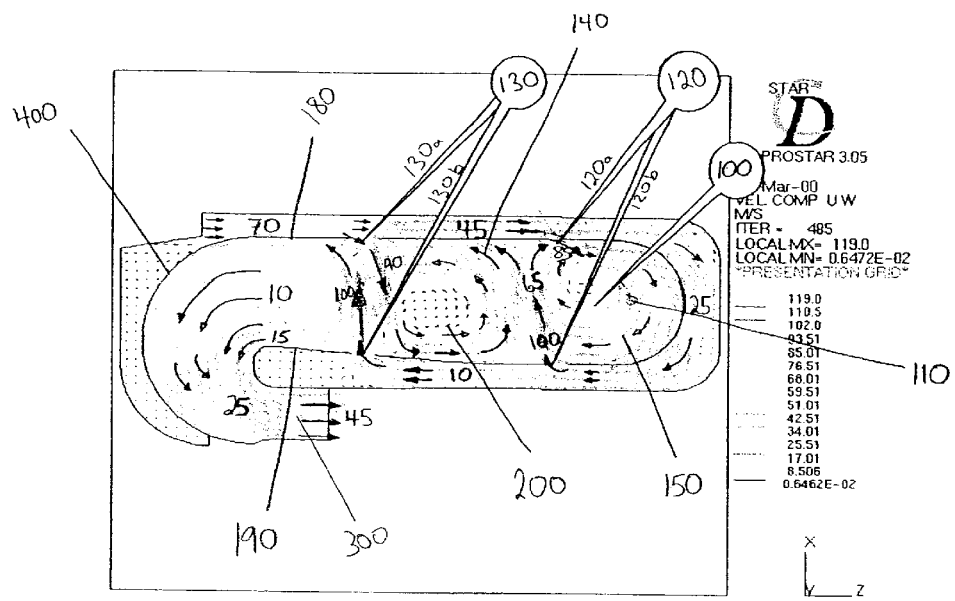
FIG. 1b is a schematic illustration of the internal aerodynamics in the conventional (prior-art) combustor of FIG. 1a, as calculated by a Computational Fluid Dynamic (CFD) computer code.

The flow of air and combustion products is better seen in FIG. 1b, which displays the internal aerodynamics of the conventional combustion chamber 400 of FIG. 1a based on the Computational Fluid Dynamic (CFD) calculations. The velocity profiles of the air are illustrated by means of arrows; the approximate magnitudes of the gas velocities are given as number values inside the combustor of FIG. 1b represent the gas velocity (in m/s) as determined by CFD. A large vortex 150, rotating clockwise, can be seen in the primary zone 100 at the right side of the combustion chamber 400. In the present example, this vortex is formed by tangential jets 120a and 120b. The inlet gas velocity of the tangential jet 120a is about 85 m/s; the inlet gas velocity of the tangential jet 120b is about 100 m/s. It should be noted that although the establishment of a large vortex is a common technique for stabilizing the flame, there are different ways to create such a vortex, and the present description is one example of such a technique. Fuel is injected into the core region of the vortex 100 (fuel injection port is illustrated in FIG. 1a). Much of the primary air, particularly from tangential jet 120a, is introduced at a point that is in close proximity to the fuel injection point 110. Moreover, the clockwise direction of the vortex brings the fresh air almost directly to the fuel injection point 110. As a result, the fuel injected meets up with fresh air containing relatively small amounts of combusted products and a high concentration of uncombusted oxygen. The flame produced by the combustion of this rich mixture of fuel and nearly-fresh air is extremely stable.

However, as the ratio between the fuel mass flow rate and the air mass flow rates is about stoichiometric, the temperature of the combustion products 140 is typically about 2500° K, which approaches the adiabatic flame temperature. These high-temperature conditions are largely responsible for the large amount of $NO_x$ production in conventional combustors. Moreover, the contact between the injected fuel and nearly-fresh air results in poor temperature distribution, leading to hot spots in the wall of the combustion chamber 400 and to high values of temperature pattern factors.

Secondary air 130a, 130b with a velocity of 90–100 m/s is introduced towards the left side of the combustion chamber 400, for the dilution and cooling of the combustion products 140 coming from the primary zone 100. As with the primary air 120, the secondary air 130 is typically introduced from ports 130a, 130b at the top side 180 and bottom side 190 of the combustion chamber 400. The temperature of the exhaust gas 300 discharged from the secondary (dilution) zone 200 to the turbine blade (shown in FIG. 1a) is reduced to about 1100–1700° K, depending on the characteristics of the turbine and its ability to withstand high temperature conditions, and on $NO_x$ requirements. The velocity of the discharged exhaust gas 300 is about 45 m/s.

Figure 2:
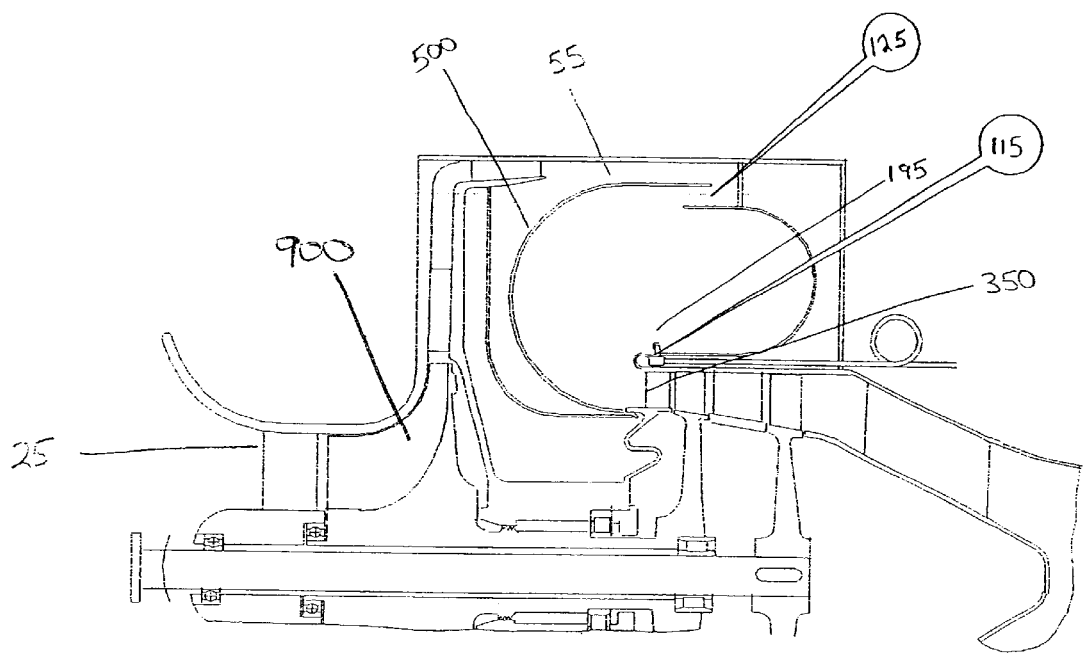
FIG. 2 is a schematic illustration of the (flameless oxidation) combustor having a single combustion zone, according to the present invention.

FIG. 2 is a schematic illustration of a gas turbine combustor according to the present invention. The overall configuration of the combustion chamber 500 is similar to that of FIG. 1a. Air is introduced from the compressor rotor 900 through the air port 25 into the air intake channel 55 surrounding the combustion chamber 500. The main air feed is introduced through the main inlet 125. Fuel is supplied via the fuel injector 115, in a zone 195 where combustion is partially complete. In FIG. 2, the fuel injector 115 is shown in a typical location, adjacent to the turbine discharge 350.

The fuel introduced by the fuel injector 115 undergoes partially vaporization (and partial combustion) in the hot vitiated air surrounding the fuel injector 115. Subsequently, near the main air inlet 128, the mixture of gases comes into contact with the fresh air supply.

Because the temperature of the recycled exhaust gas exceeds the auto-ignition temperature of the fuel, continuous combustion is sustained. Under these flameless oxidation conditions, high temperatures zones are minimized, such that the generation of $NO_x$ is greatly reduced.

Moreover, as a result of the internal temperature reduction, less wall cooling (if at all) is required. When used, the wall cooling injection points should be oriented in such a way as to augment the circumferential momentum of the main vortex.

Finally, the elimination or significant reduction of temperature peaks enables operation of the combustor at a higher average temperature, thereby improving turbine performance without impairing safety or reducing turbine lifetime.

Figure 3A:
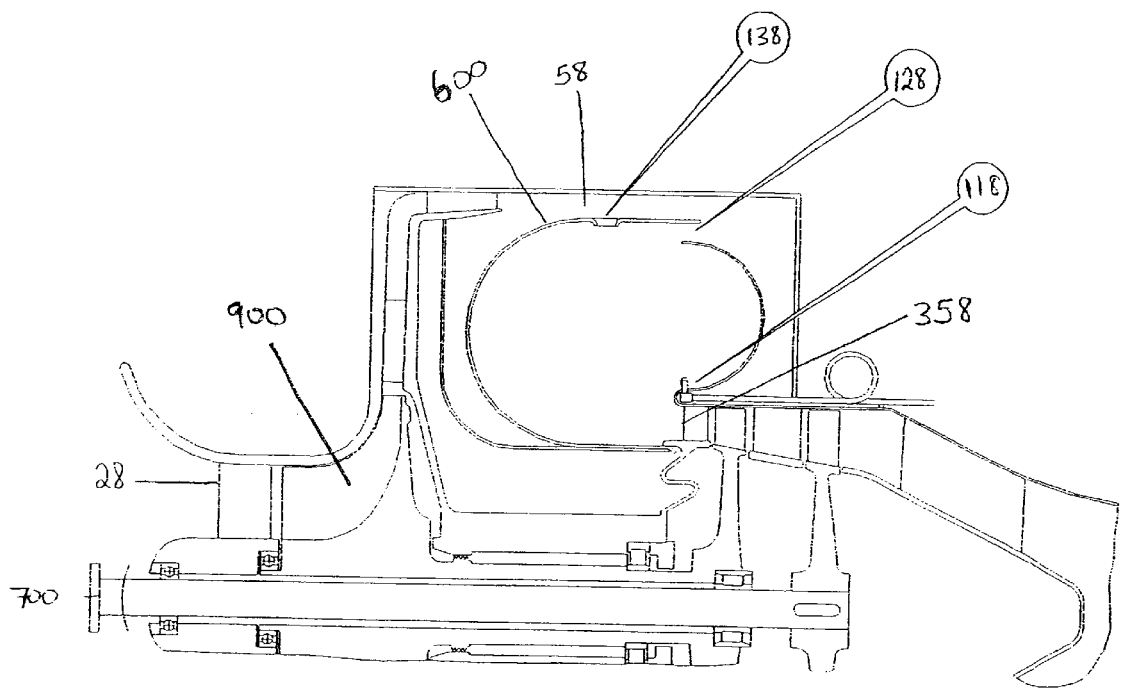
FIG. 3a is a schematic illustration of the flameless oxidation combustor having dual combustion zones chamber design, according to the present invention.

FIG. 3a is a schematic illustration of the present invention incorporating dual combustion zones. Air is introduced from the environment through the air port 28 into the air intake channel 58 surrounding the combustion chamber 600. The primary air feed is introduced through the main inlet 128. Secondary air is introduced through at least one entry port 138. Fuel is supplied via the fuel injector 118, in a vitiated-air zone, adjacent to the turbine discharge 358 at the bottom of combustor, wherein the gases introduced have undergone partial combustion, such that the oxygen level these gases has been lowered substantially. The fuel is injected through fuel atomizers of the known art (not shown), which augment the vortex momentum in the direction of the vortex rotation and substantially inhibit the formation of droplets, which have a tendency to form due to collision with the walls of the combustion chamber.

Figure 3B:
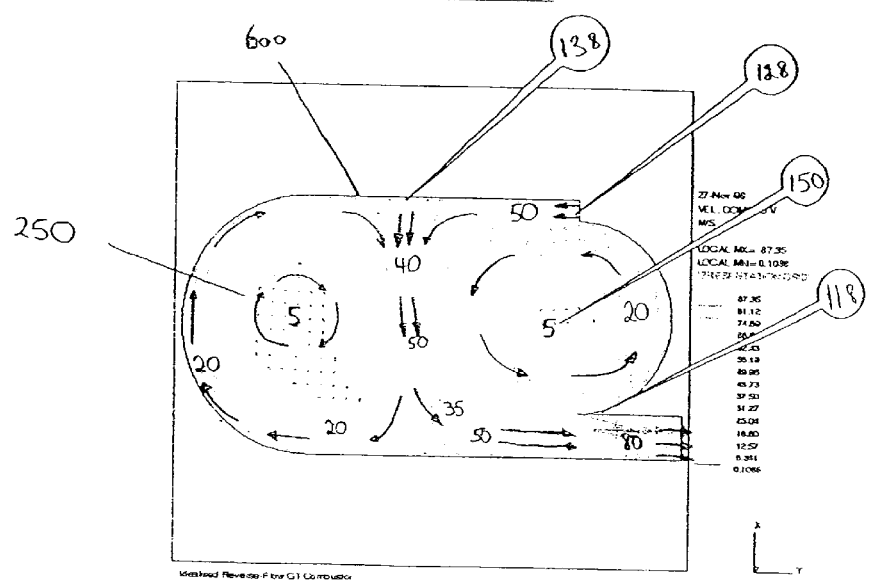
FIG. 3b is a schematic illustration of the internal aerodynamics in the (flameless oxidation) combustor of FIG. 3a, as calculated by a CFD computer code.
Figure 1B:
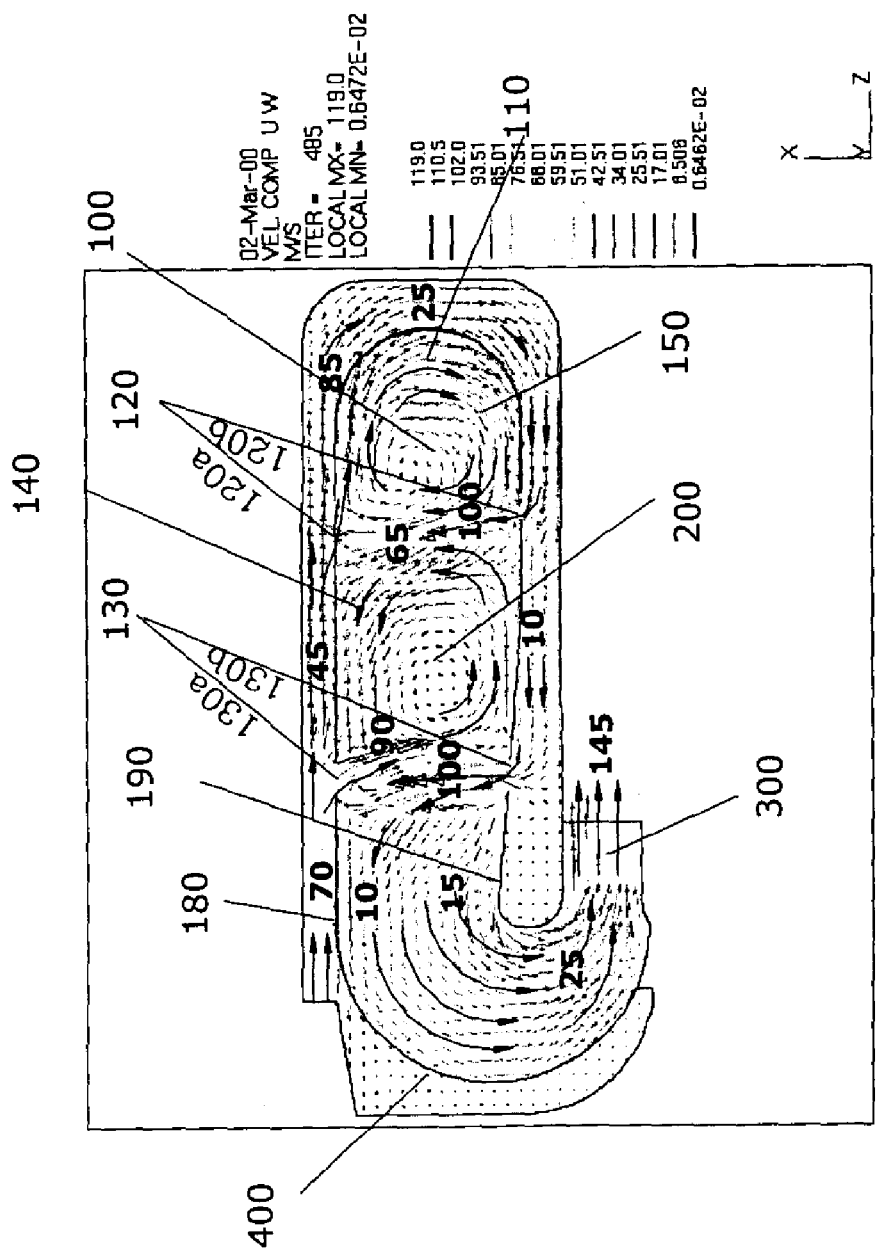
Figure 2:
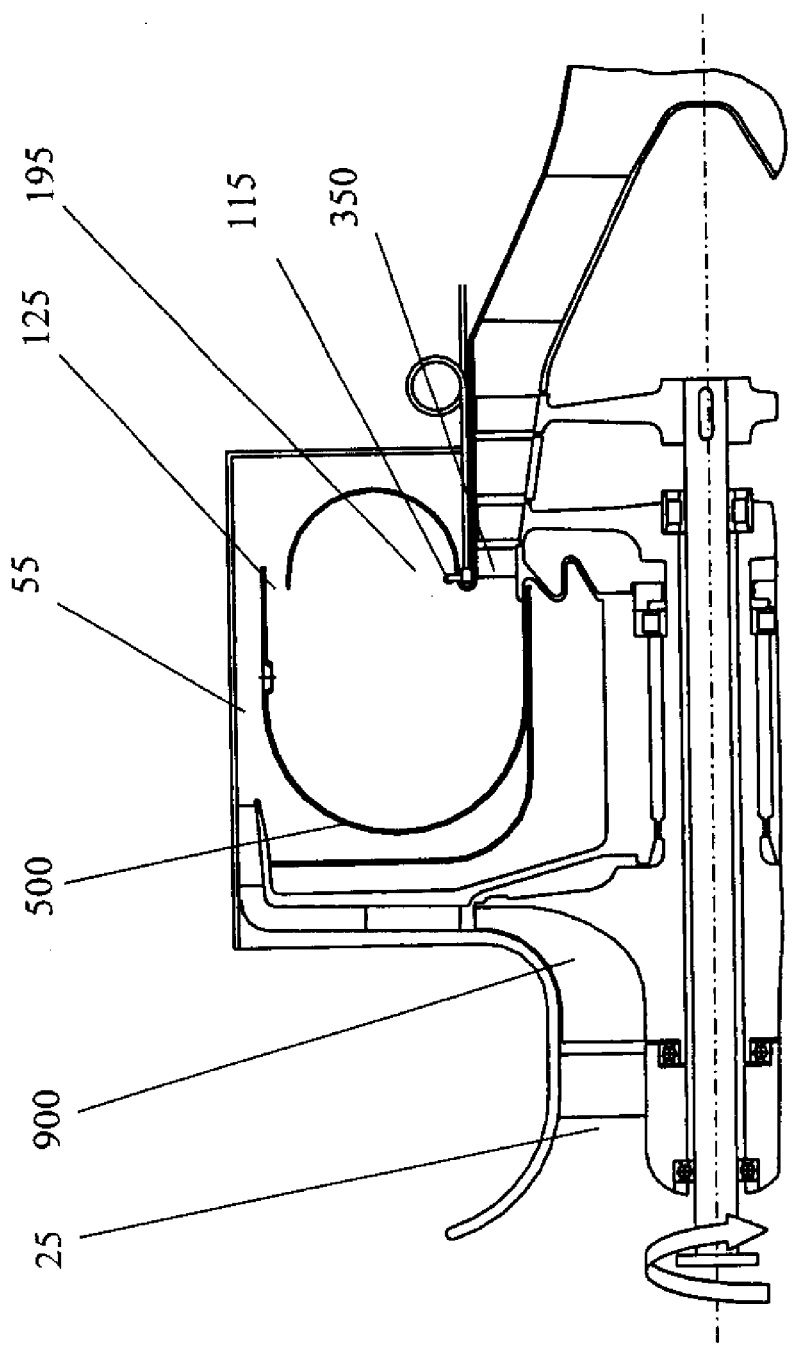
Figure 3A:
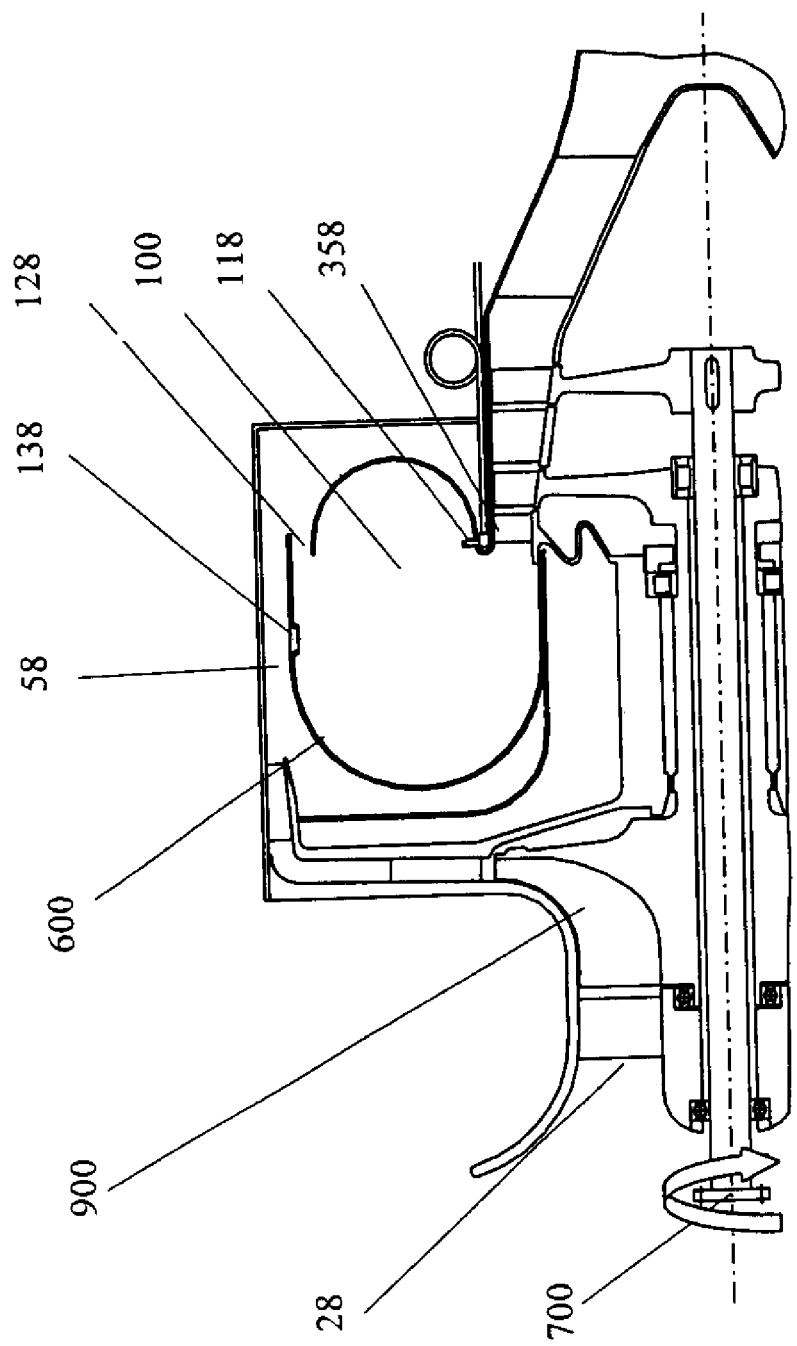
Figure 3B:
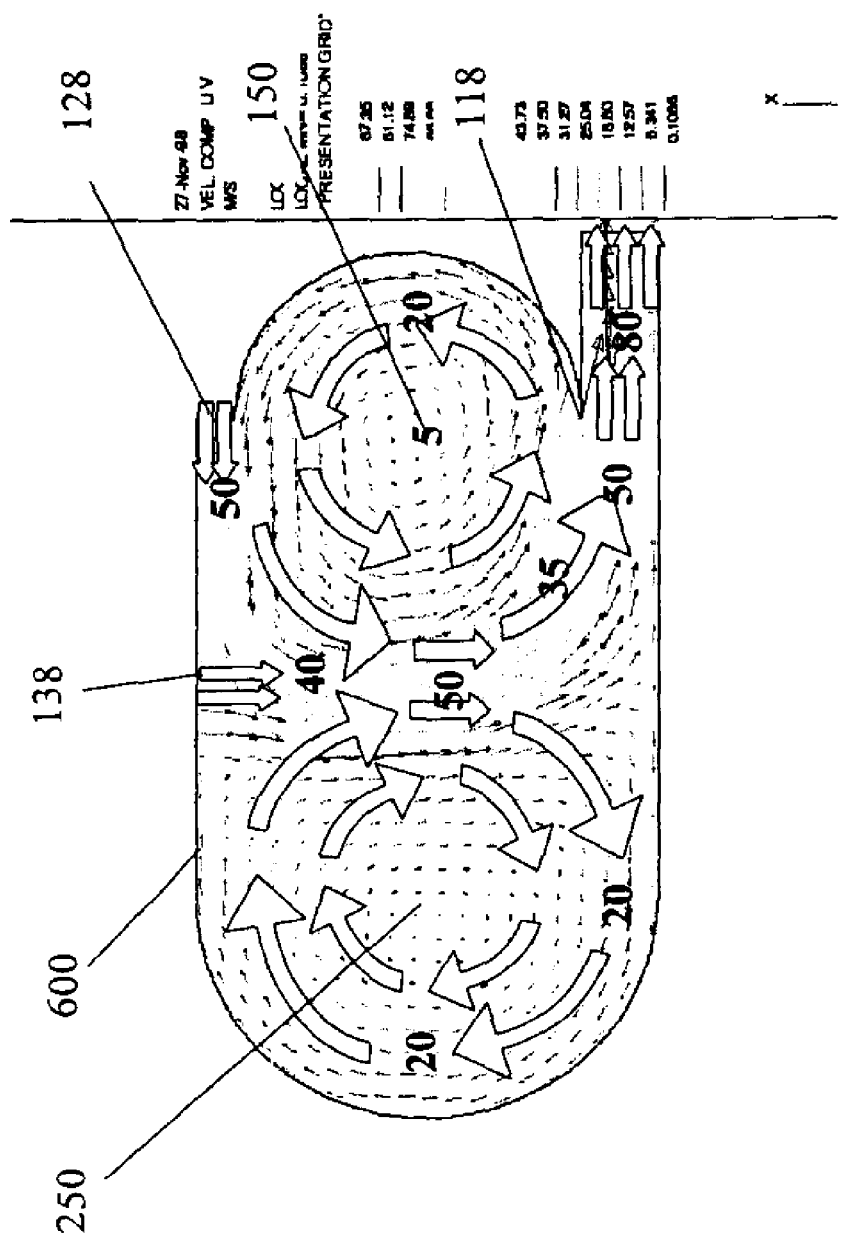
Figure 4B:
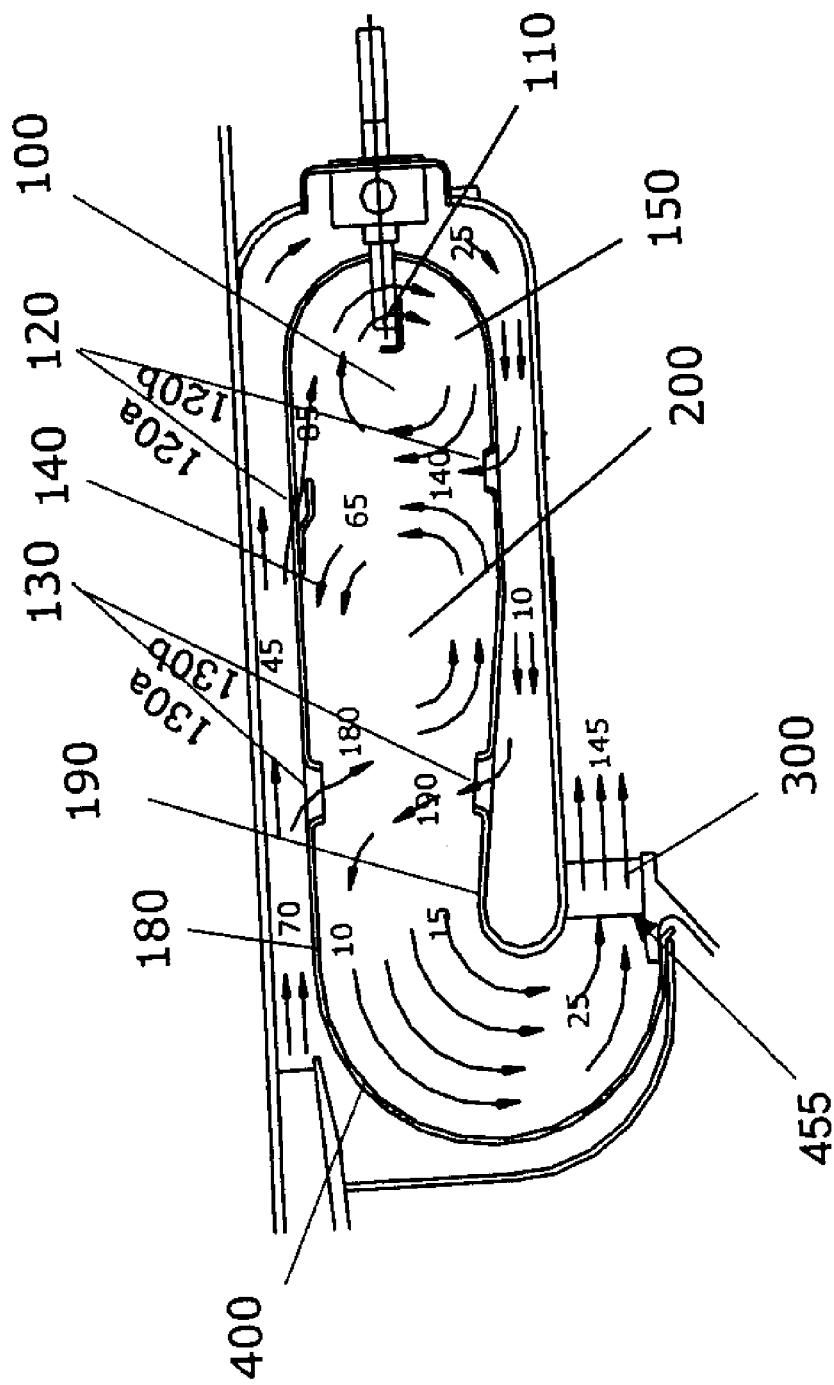
Figure 4C:
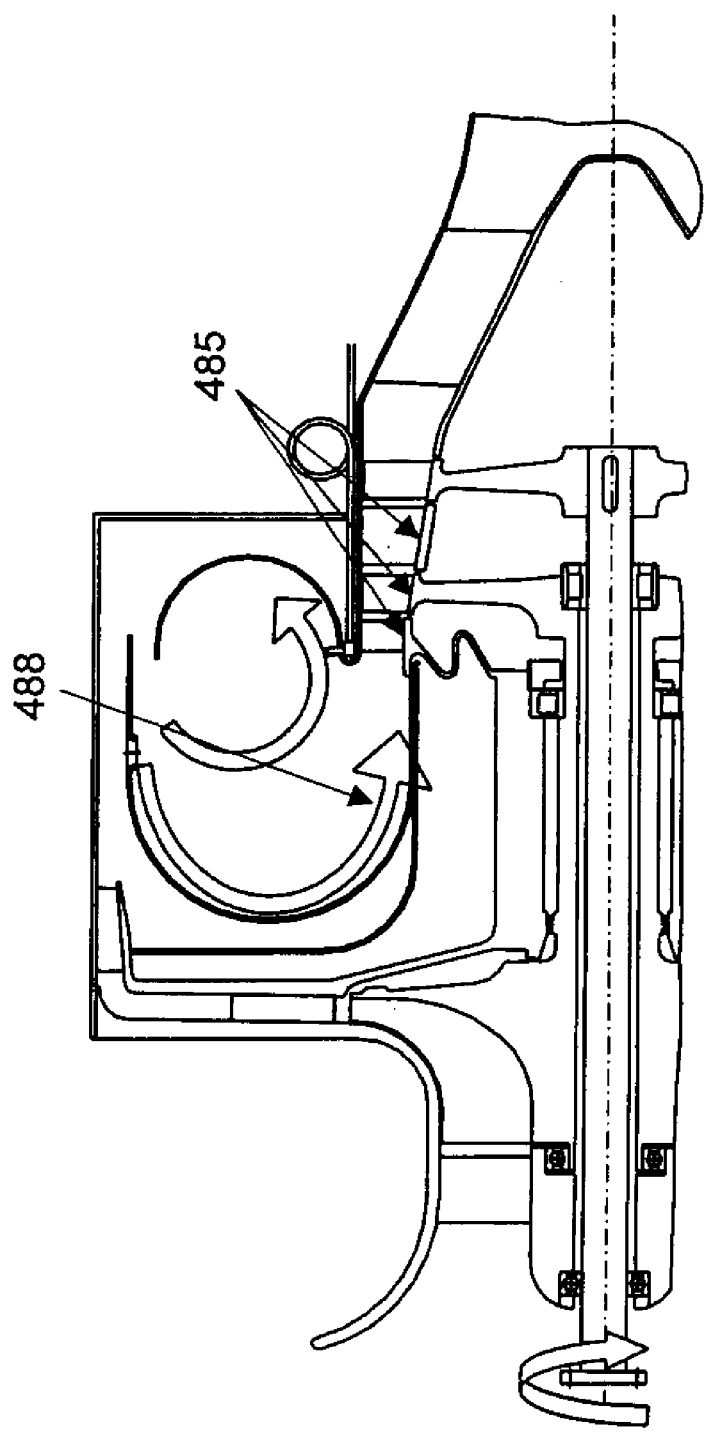

FIG. 3b is a schematic illustration of the internal aerodynamics in the inventive combustion chamber 600 provided in FIG. 3a. The locations of the primary 128 and secondary 138 air inlets are clearly seen from the velocity vectors of the air jets. In the specific example illustrated in FIG. 3b, the large primary vortex 150 rotates counter-clockwise. Unlike prior art combustors (e.g., FIG. 1), in which the direction of the primary vortex brings the fresh air almost directly to the fuel injection point, the primary vortex in the inventive combustor 150 draws the fresh air away from the fuel injector 118. Coupled with the relatively large distance between the primary air inlet 128 and the fuel injector 118, this causes the fresh air to be diluted with combustion gases, producing vitiated air. Thus, unlike prior art combustors, the inventive combustor introduces the fuel into a surroundings of vitiated air, such that the flame is established by flameless oxidation.

The additional air introduced to the secondary zone reduces the high temperature gases from the primary zone to the values permissible by the turbine and to complete combustion, if necessary. The secondary air introduced through inlet 138 causes a smaller vortex 250, rotating clockwise, to form in the combustion chamber 600 at the end of the chamber opposite the primary air inlet 128 and the fuel injector 118.

The velocity at the primary air inlet 128 is about 50 m/s; the velocity at the secondary air inlet 138 is about 40 m/s. The velocity around the perimeter of the primary vortex 150 and the secondary vortex 250 is 20–30 m/s. The velocity at the turbine discharge 358 at the bottom of combustor is about 70–80 m/s.

The combustor parts may include an air diffuser (not shown) to slow down the air originating from the compressor outlet. The one or more air inlets are designed to obtain the specific air momentum required to sustain the large vortex that allows internal recirculation. The fuel inlet can be either of the injector, atomizer or vaporizer type.

However, it is preferable to employ a large momentum fuel supply system in the direction of the large vortex to improve vortex stability.

Air-cooling can be applied but is not required. When applied, cooling holes are positioned to prevent contact between fresh air and fuel and to contribute to the large vortex. In the dual zone design (FIGS. 3a, 3b), cooling holes are positioned to produce a secondary vortex 250, circulating in the direction opposite to the large vortex 150 of the primary zone 100. In the unique zone design (FIG. 2), the cooling air is entrained in the direction of the principal vortex. The geometric form of the combustor is dictated, in general, by the vortex pattern. The preferred design according to the present invention may be of a more compact and circular form as compared to the elongated form of classic combustors (as illustrated in FIG. 1a). Slight modifications in the mean diameter and total volume of the combustion chamber may be necessary due to the increased combustion product residence time in the combustor.

One of the more important features in the novel design is the positioning of the main air inlet relative to the fuel supply system, wherein the fuel is injected into the surroundings of vitiated air. In FIG. 3a, by way of example, the fuel injector 118 is located towards the periphery of the large primary zone 100 vortex (150 in FIG. 3b), substantially diametrically opposed to the primary air inlet 128. However, many alternatives, modifications and variations for effecting the introduction of fuel into a vitiated air stream will be apparent to those skilled in the art.

The main air is entered in such a way as to form a large recirculation vortex. At about the end of the circumference of the vortex, the fuel is introduced into the hot and pressurized vitiated air environment by the injection system, which is mounted in such a way as to supply the fuel into the vitiated air environment. In addition, the momentum of the injected fuel is used to augment and stabilize the circulation of the main vortex. At a later stage, the mixture of the already partially pre evaporated fuel and/or burned fuel and vitiated air are mixed together with the fresh air.

The aerodynamic pattern obtained according to the present invention is characterized by a principal, toroidal vortex generated by internal recirculation. The long residence time allowed by the large toroidal vortex is favorable for burning low calorific gases such as synthesis gas produced from biomass.

This aerodynamic pattern enables the reduction of the CO and UHC (Unburned Hydro Carbons) levels, as a sufficiently-long residence time is provided to complete burn-out and to avoid temperature peaks that lead to $NO_x$ formation.

The large vortex enables the injection of fuel directly into the vitiated air from the wall of the combustion chamber. This is safer than many current designs in which the fuel lines and atomizers are exposed to high temperatures.

The main flow motion and the mixing are achieved by the tangential introduction of air at the inlet of the combustor. In principal, no additional dilution holes—or jet ejectors for effecting the dilution are necessary, because the entire air supply can be introduced through one long circumferential slot, or a series of small holes distributed along the combustor periphery. As a result, superior tangential temperature uniformity is achieved, and the overall temperature distribution is considerably more homogeneous. This improves the pattern factor of the exhaust gases and extends the lifetime of the turbine.

The large toroidal vortex results in parallel flow to the walls, which lowers and homogenizes the metal wall temperature. This reduces the wall-cooling requirement, which increases the energy efficiency of the gas turbine, and appreciably reduces the formation of hot spots and thermal stresses in the metal walls. Moreover, dilution jets of the prior art discharge hot streams that can impinge upon the opposing walls of the combustor and magnify the problem of hot spots (due to increased heat transfer). These dilution jets are not required in the combustor of the present invention. Thus, there are several distinct features of the present invention that prolong the lifetime of the combustor.

As described hereinabove, in the present invention, the primary air enters the primary zone through a circumferential slot that is situated close to the outer diameter of the combustion chamber. The air is oriented in a tangential direction and flows along the inner side of the combustor wall (see FIG. 4c, which is based on FIG. 2). A portion 488 of this jet-like air stream flows along the wall and is directed out of the combustor and towards contact the root of the turbine blades 485. Since air stream portion 488 is substantially cooler than the combustion gases, root 485 is cooled. Maintaining the root of the turbine blade at a relatively low temperature (relative to the middle part or the tip of the blade) is a highly desirable design objective, as the mechanical strength of the metal is increased. This is needed because root 485 is subjected to larger mechanical stresses, relative to the middle part or the tip of the blade.

Other combustor designs are structurally incapable of providing this feature. In many typical combustors (see FIG. 4b, which is based on FIGS. 1a and 1b), the air is introduced as individual jets that are oriented in perpendicular fashion with respect to the combustor wall. Moreover, even secondary air 130b meets up with copious quantities of hot combustion gases coming from primary zone 100 and secondary zone 200, such that the gases in the vicinity of root 455 are no cooler than the average temperature of the gases discharged from the combustion chamber.

Another prior art gas turbine engine (disclosed by U.S. Pat. No. 4,151,709 to Melconian, et al.) is provided in FIG. 4a. None of the inlet air (neither the main air moving in direction 408 nor the secondary air) is directed specifically to the root 405 of the turbine blades, such that the root does not receive a stream of gas that is cooler than the average temperature of the discharged gases B.

The significant advantages of the combustor according to the present invention over the prior art are further delineated below.

Reducing Pollutant Impact on the Global Climate and on the Local Environment

The environmental benefits of the new combustion technology are achieved by reducing the emission of both $NO_x$ and $CO_2$. These emissions contribute to global climate change as well as to local pollution. $NO_x$ contributes to low-level ozone pollution, photochemical smog and acid rain and bears partial responsibility for the depletion of stratospheric ozone.

In gas turbine combustors of the present invention, $NO_x$ emission levels are reduced in a safe and efficient way to below 20 ppmv. Moreover, as industrial furnaces with heat exchanger in non-adiabatic cycles attain $NO_x$ levels as low as 5 ppmv using flameless oxidation, it is probable that such levels could be achieved in adiabatic combustors as well.

The $CO_2$ emission reduction results from reduced fuel consumption, achieved through improved cycle efficiency. The improved efficiency results from the ability to operate at higher pressures and turbine entry temperatures, and does not come at the expense of $NO_x$ emission levels.

Utilization of Lower-Grade Fuels and Renewable Energies, Including Waste

The principal design modification of the combustor results in the formation of a central vortex that internally recirculates a portion of the burned gases. The fuel is injected into the hot recirculated combustion products, which significantly increases the flammability limits and enables operation at super-adiabatic temperatures. Consequently, lower-grade gaseous or liquid fuels can be utilized in a safe and efficient manner.

The capability of operating at super-adiabatic temperatures while maintaining $NO_x$ emissions at ultra-low levels, enables the viable utilization of renewable energy sources and the integration of such resources in existing power unit systems. In addition, flameless oxidation technology is particularly suitable for liquid fuels and for low-calorific value synthetic gases typically produced in the gasification or pyrolysis of biomass (including waste).

Improved Efficiency of Gas Turbines

The low $NO_x$ emission levels from flameless oxidation combustors (in comparison to other conventional dry-low $NO_x$ technologies) enable the gas turbine to operate at higher pressures and higher Turbine Inlet Temperatures (TIT) levels, thereby improving the efficiencies of the various gas turbines. In power systems that incorporate a heat exchanger (e.g., in a regenerative cycle), the effect of TIT on the efficiency is even more pronounced. The combustor of the present invention allows these advantages of flameless oxidation to be realized in adiabatic-type combustion processes.

Improved availability and reliability

Availability and reliability are typically defined as:

Availability(%)=((available time(hours)/unit period(hours))×100

Reliability(%)=(1−forced downtime(hours)/unit period(hours))×100

It is well known that two of the more sensitive components in conventional gas turbines—the combustor and the turbine stator and rotor blades—are situated in particularly hot areas. The combustion technology of the present invention extends the lifetime of both components and hence the availability and reliability of the gas turbine. This is done by reducing the wall temperature (through lowering the temperature in the primary zone), unifying the temperature distribution, thereby lowering thermal stress, and implementing innovative wall cooling methods and improved fuel injection techniques. The innovative wall cooling techniques result in further homogenization of the combustor wall temperature, such that thermal stress is reduced and combustor operating lifetime is extended appreciably. The circumferential distribution of the fuel injected into the combustor is more uniform, resulting in an improved circumferential gas temperature profile at the combustor discharge and hence, in the upstream flow to the turbine blades.

Lower Operating Costs

Unlike many techniques for reducing emission levels, the present invention actually reduces operating costs through lower fuel consumption (higher efficiency) and reduced thermal shock and thermal stress.

Retrofitting in Existing Power Plants

The new combustion technology is applicable for designing retrofit combustors that will be used as upgrades to existing power plants. The global flow parameters in the flameless oxidation combustor are similar to those of conventional combustors and only minor changes in the ducts between the compressors and the combustor are necessary. In such applications, where the operating conditions of the gas turbine remain the same (combustion pressure and TIT), the main benefits from the retrofit will be lower emission levels and higher availability and reliability of the power plant. Relative to retrofitting using known technologies producing low levels of $NO_x$ gases, it appears that significant capital savings can be achieved.

The combustion chamber according to the present invention is similar in design to classic combustion chambers. No additional production equipment is required and the main improvements originate solely from the modification of the internal aerodynamic patterns. Classic construction processes and materials can be used.

The instant invention is relevant to a variety of small as well as large energy-production systems, including electric power generation by gas turbine in an "open" cycle, with or without regeneration (heat exchangers). It is equally applicable to power systems operating in the combined Brayton/Rankin Cycle using steam and gas turbines for power and heat generation. The technology is also suitable for powering large and medium transportation systems such as trains and trucks. It is also applicable for use in small power supply units and for non-stationary applications.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system comprising:
    an adiabatic combustor for a gas turbine, said combustor including:
       a) a combustion chamber designed and configured to produce high-pressure combustion gases for said turbine, said combustion chamber having a primary combustion zone containing a substantially vitiated-air zone;
       b) at least one primary air inlet providing air to said primary combustion zone, and
       c) a fuel injector for injecting fuel, disposed such that said fuel is directly introduced to said vitiated-air zone,
    said primary air inlet being positioned and directed, and said combustion chamber being designed and configured, so as to produce an internal recirculation that generates a toroidal vortex within said primary combustion zone, thereby producing therein said vitiated-air zone and maintaining therein a state of flameless oxidation.

2. The system of claim 1, wherein said toroidal vortex is disposed throughout said primary combustion zone.

3. The system of claim 1, wherein said primary air inlet is positioned so as to direct air away from said fuel injector.

4. The system of claim 2, wherein said fuel injector is designed and disposed so as to inject all of said fuel into said vortex disposed throughout said primary combustion zone.

5. The system of claim 1, wherein said fuel injector is designed and disposed such that all said fuel is directly introduced into said vitiated-air zone.

6. The system of claim 1, wherein said primary air inlet is designed and disposed such that said air is directly introduced to the periphery of said vitiated-air zone.

7. The system of claim 1, wherein said fuel injector and said primary air inlet are disposed along a perimeter of said primary combustion zone.

8. The system of claim 1, wherein said fuel injector and said primary air inlet injector are removed from one another and are disposed on opposing sides of said primary combustion zone.

9. The system of claim 1, wherein said toroidal vortex separates between said fuel injector and each said primary air inlet.

10. The system of claim 1, wherein said fuel injector and said primary air inlet are disposed such that said fuel is mixed and combusted solely with vitiated air.

11. The system of claim 5, wherein said primary air inlet is designed and disposed such that said air is directly introduced to the periphery of said vitiated-air zone.

12. The system of claim 7, wherein said fuel injector and said primary air inlet are remote from one another and are disposed on opposite sides of said primary combustion zone.

13. The system of claim 1, wherein said primary air inlet is designed and disposed such that said air is directly and tangentially introduced into said vitiated-air zone.

14. The system of claim 1, wherein said primary air inlet is disposed and designed such that said air is directly and tangentially introduced to said toroidal vortex.

15. The system of claim 14, wherein said primary air inlet is further disposed such that an initial path of said air is directed away from said fuel.

16. The system of claim 15, wherein said internal recirculation is attained by means of a first vortex, and wherein said fuel injected into said vitiated-air zone has momentum, said momentum being used to augment and stabilize the circulation of said first vortex.

17. The system of claim 15, wherein said primary air inlet provides substantially all of the air introduced to said combustion chamber.

18. The system of claim 15, wherein at least one secondary air inlet is positioned and directed to maintain a second vortex.

19. The system of claim 18, said secondary air inlet being further positioned and directed so as to help maintain said first vortex.

20. The system of claim 12, said adiabatic combustor further including:
   d) an exhaust port for discharge of exhaust gases from said combustion chamber, said discharge port being disposed along a periphery of said first vortex, said discharge port and said primary air inlet being disposed on opposite sides of said primary combustion zone.

21. The system of claim 12, wherein said first vortex and said exhaust gases discharged from said combustor have a substantially identical flow direction.

22. The system of claim 18, wherein said secondary air inlet is disposed on a wall of said combustion chamber, said secondary air inlet being positioned and directed so as to maintain a second vortex within said combustion chamber.

23. The system of claim 12, said adiabatic combustor further including:
   d) an exhaust port for discharge of exhaust gases from said combustion chamber,
wherein said exhaust port is disposed adjacent to said primary combustion zone, and wherein said exhaust port is and directed such that said toroidal vortex and said exhaust gases discharged from said exhaust port have a substantially identical flow direction.

24. The system of claim 1, wherein said combustion chamber for producing said pressurized combustion gases for said turbine is designed and configured to maintain a pressure of from about 4 bar to about 40 bar within said chamber.

25. The system of claim 1, wherein said primary air inlet is further positioned and directed, and said combustion chamber is further designed and configured, so as to direct a cool gas stream towards a root of blades of said turbine, thereby cooling said root.

26. The system of claim 25, wherein said cool gas stream is directed along an interior wall of said combustion chamber.

27. The system of claim 1, wherein said fuel injector is disposed near an inlet of said gas turbine and within said chamber, such that said fuel is directly introduced to said vitiated-air zone.

28. The system of claim 1, wherein said fuel injector and said primary air inlet are further disposed such that said fuel is mixed and combusted solely with vitiated air, and wherein said primary air inlet is positioned and directed, and said combustion chamber is designed and configured, so as to produce an internal recirculation that generates a toroidal vortex within said primary combustion zone, thereby producing therein said vitiated-air zone and maintaining therein a state of flameless oxidation.

29. The energy-production system of claim 28, wherein said high-pressure combustion gases are discharged from said combustion chamber at a temperature of at least 1800° K and have a $NO_x$ level below 20 ppmv.

30. The energy-production system of claim 28, wherein said high-pressure combustion gases are discharged from said combustion chamber at a temperature of at least 1600° K and have a $NO_x$ level below 20 ppmv.

31. The energy-production system of claim 28, wherein said high-pressure combustion gases are discharged from said combustion chamber at a temperature of at least 1600° K and have a $NO_x$ level below 10 ppmv.

32. A system comprising:
   an adiabatic combustor for a gas turbine, said combustor including:
   a) a high-pressure combustion chamber designed and configured to produce high-pressure combustion gases for said turbine, said combustion chamber having a primary combustion zone containing a substantially vitiated-air zone,
   b) a primary air inlet providing all primary air to said primary combustion zone; said primary air inlet being disposed in a first side of said combustion chamber, and
   c) a fuel injector for injecting fuel, said fuel injector being disposed in a second side of said combustion chamber, said second side being opposite to said first side,
said primary air inlet being positioned and directed, and said combustion chamber being designed and configured, so as to produce an internal recirculation that generates a toroidal vortex within said primary combustion zone, thereby producing therein said vitiated-air zone and maintaining therein a state of flameless oxidation.

33. The system of claim 32, wherein said primary air inlet is disposed so as to tangentially introduce said air along a periphery of said vortex.

* * * * *

UNITED STATES PATENT AND TRADEMARK OFFICE
CERTIFICATE OF CORRECTION

PATENT NO. : 6,826,912 B2
DATED : December 7, 2004
INVENTOR(S) : Levy et al.

It is certified that error appears in the above-identified patent and that said Letters Patent is hereby corrected as shown below:

Drawings,
Please replace drawings with the following formal drawings (8 sheets)

Signed and Sealed this

Fifteenth Day of February, 2005

JON W. DUDAS
*Director of the United States Patent and Trademark Office*

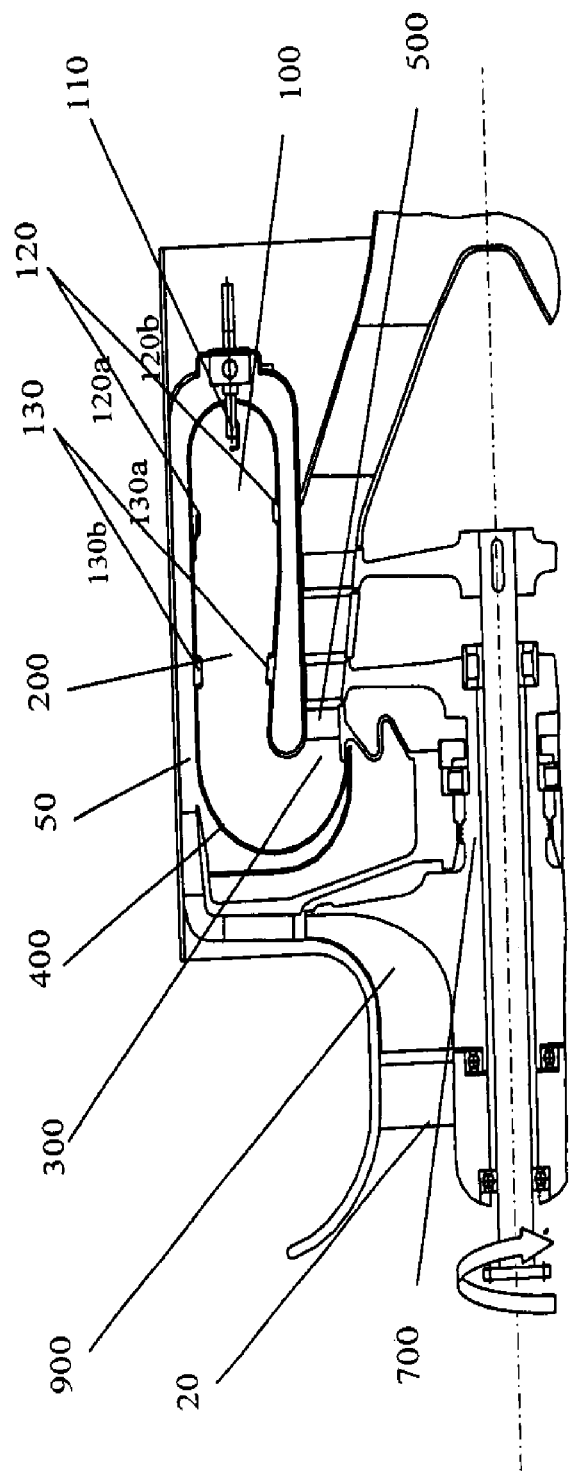

Figure 4A:
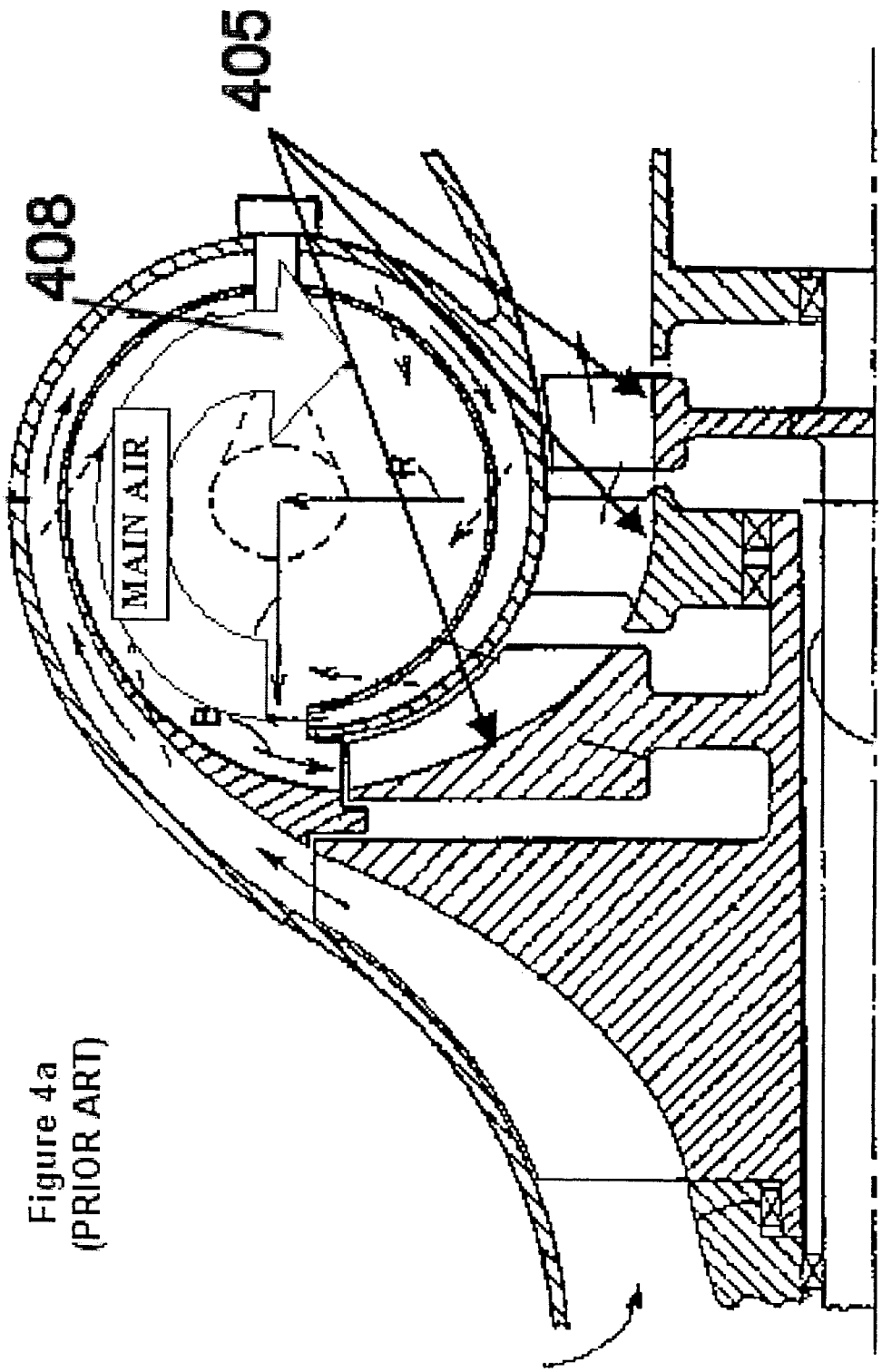
FIG. 4a is a gas turbine system of the prior art.
Figure 4B:
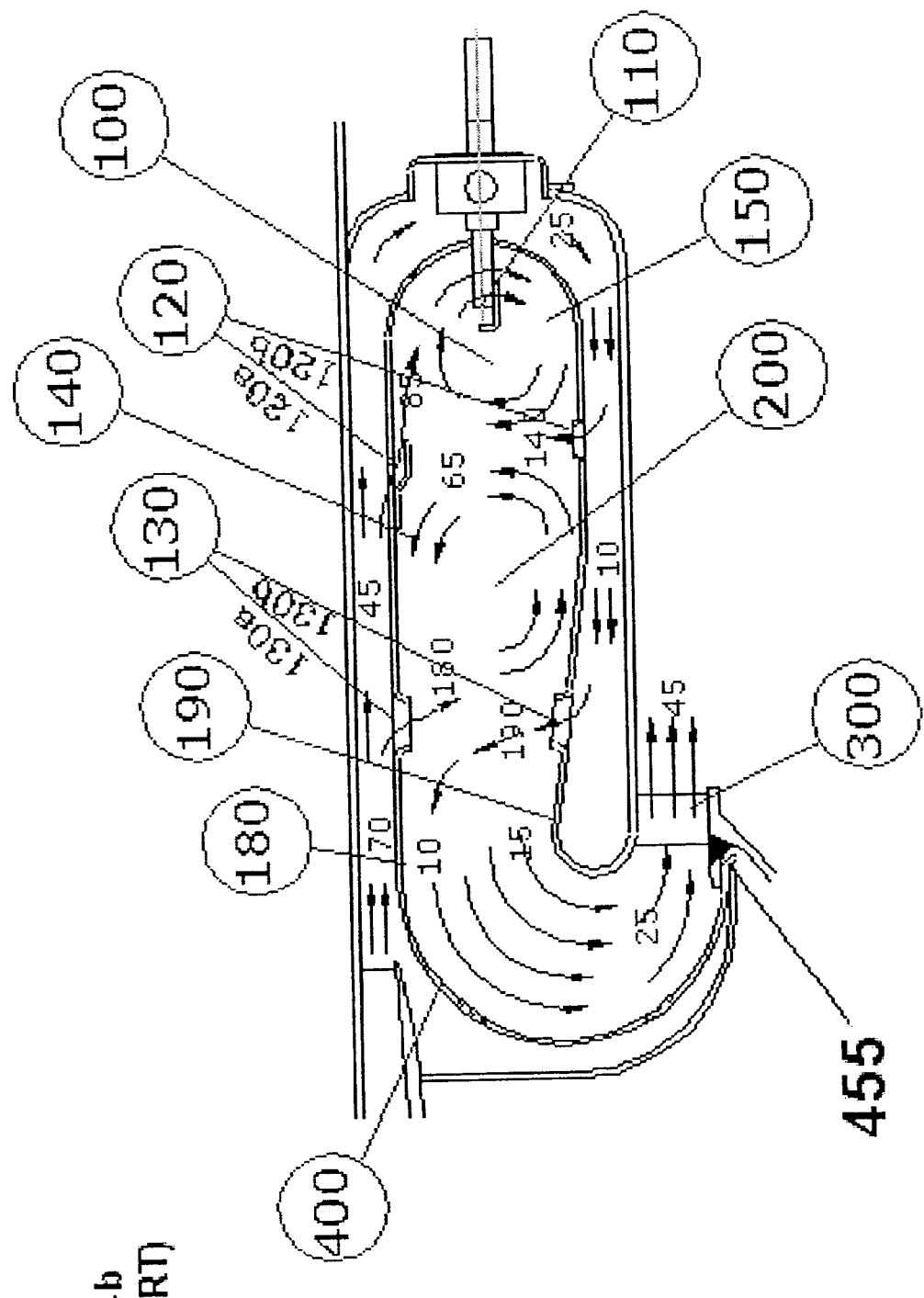
FIG. 4b is another gas turbine system of the prior art.
Figure 4C:
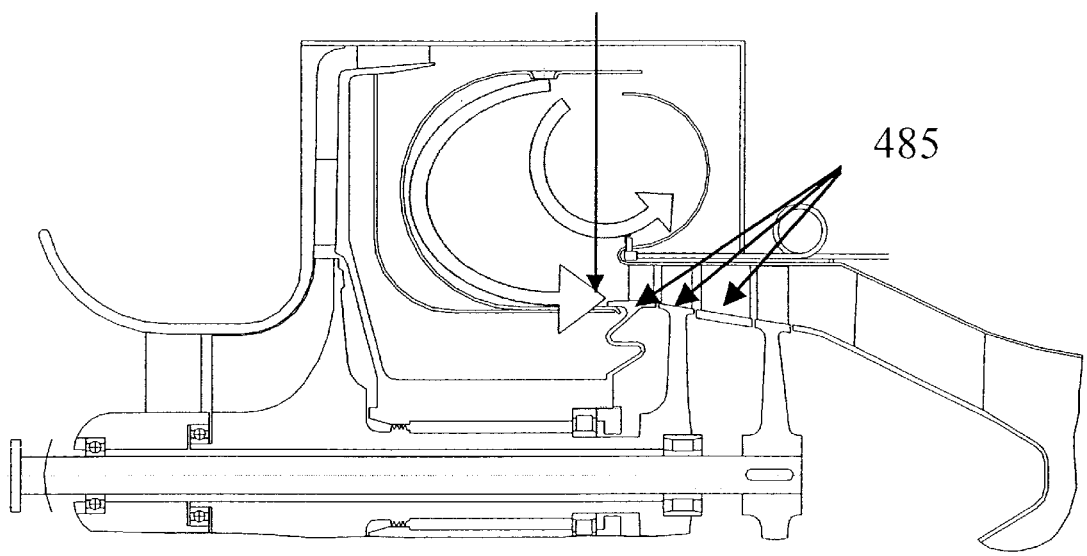
FIG. 4c is a gas turbine system of the present invention in which a cool stream of gas from the combustion chamber cools the root of the gas turbine blades.

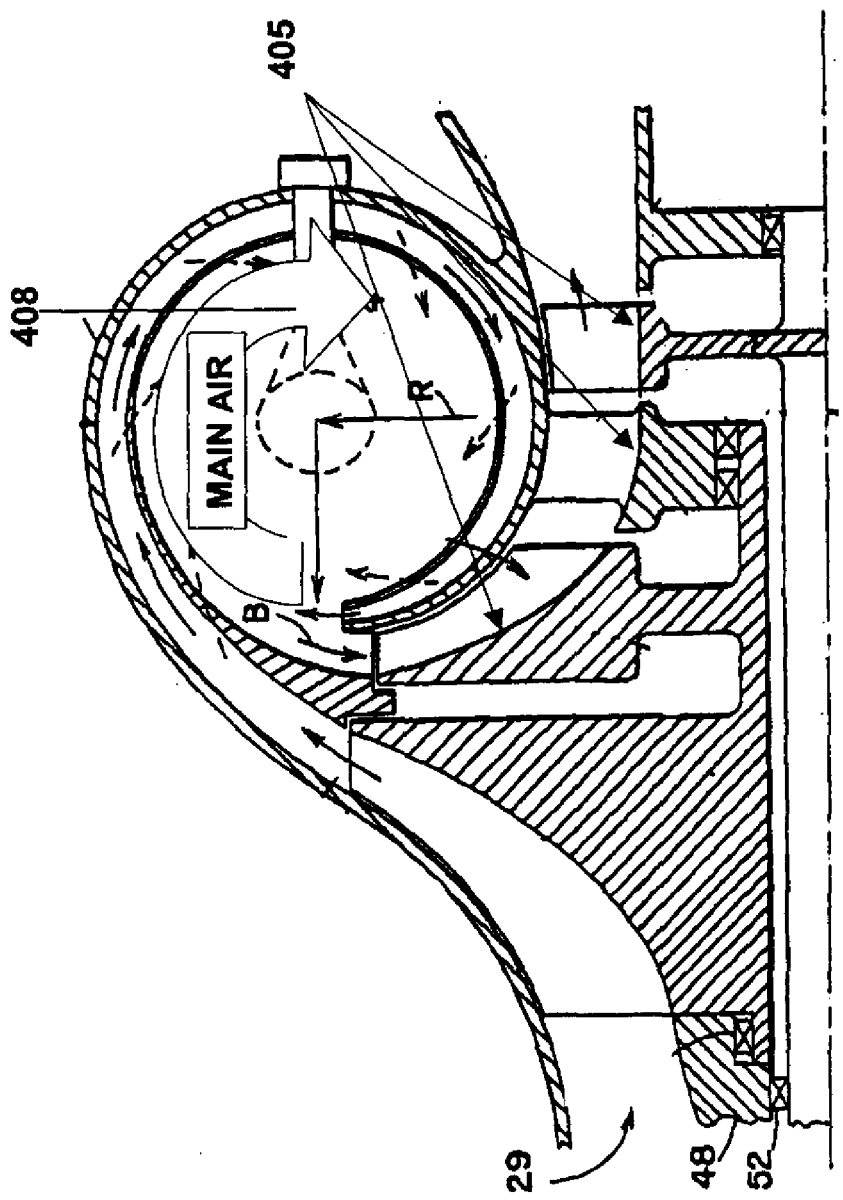
FIGURE 4a – PRIOR ART